(12) United States Patent
Kurihara et al.

(10) Patent No.: US 10,427,297 B2
(45) Date of Patent: Oct. 1, 2019

(54) ROBOT OPERATION COMMAND SYSTEM, TABLET TERMINAL AND CONTROL METHOD OF TABLET TERMINAL

(71) Applicant: FANUC CORPORATION, Yamanashi (JP)

(72) Inventors: Yuusuke Kurihara, Yamanashi-ken (JP); Tomoyuki Yamamoto, Yamanashi-ken (JP); Hiromitsu Takahashi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 15/897,208

(22) Filed: Feb. 15, 2018

(65) Prior Publication Data

US 2018/0229363 A1    Aug. 16, 2018

(30) Foreign Application Priority Data

Feb. 16, 2017   (JP) ................... 2017-026567

(51) Int. Cl.
    *B25J 9/16*      (2006.01)

(52) U.S. Cl.
     CPC ............ *B25J 9/161* (2013.01); *B25J 9/1674* (2013.01); *G05B 2219/36152* (2013.01); *G05B 2219/36542* (2013.01); *Y10S 901/02* (2013.01); *Y10S 901/49* (2013.01)

(58) Field of Classification Search
     CPC ............. B25J 9/161; B25J 9/1674; G05B 2219/36152; G05B 2219/36542; Y10S 901/02; Y10S 901/49

See application file for complete search history.

(56) References Cited

U.S. PATENT DOCUMENTS

| | | | |
|---|---|---|---|
| 7,577,497 B2 * | 8/2009 | Johannessen | B25J 9/1674 318/568.11 |
| 2004/0248619 A1 | 12/2004 | Graiger et al. | |
| 2006/0232236 A1 | 10/2006 | Calcagno | |
| 2014/0229033 A1 * | 8/2014 | Cook | G05B 19/00 701/2 |

FOREIGN PATENT DOCUMENTS

| | | |
|---|---|---|
| JP | 2003200371 A | 7/2003 |
| JP | 2006-277531 A | 10/2006 |

(Continued)

OTHER PUBLICATIONS

English Abstract and Machine Translation for Japanese Publication No. 2016-068242 A, published May 9, 2016, 8 pgs.

(Continued)

*Primary Examiner* — Robert T Nguyen
(74) *Attorney, Agent, or Firm* — Fredrikson & Byron, P.A.

(57) ABSTRACT

A tablet terminal that establishes a wireless connection with one of a plurality of controllers each having identification information and transmits an operation signal for commanding operation of a robot to the wirelessly connected controller, is configured to prevent the robot from being operated by the operation signal when the identification information of the controller to which the base holding the tablet terminal is connected does not coincide with the identification information of the controller to which the tablet terminal is connected.

11 Claims, 8 Drawing Sheets

(56) References Cited

FOREIGN PATENT DOCUMENTS

| JP | 2006-297589 A | 11/2006 |
| JP | 2006297590 A | 11/2006 |
| JP | 2007-042061 A | 2/2007 |
| JP | 2012148350 A | 8/2012 |
| JP | 2015-177304 A | 10/2015 |
| JP | 2016-016496 A | 2/2016 |
| JP | 2016-060016 A | 4/2016 |
| JP | 2016-060018 A | 4/2016 |
| JP | 201668242 A | 5/2016 |
| JP | 2018-517571 A | 7/2018 |

OTHER PUBLICATIONS

English Abstract and Machine Translation for Japanese Publication No. 2012-148350 A, published Aug. 9, 2012, 14 pgs.
English Abstract for Japanese Publication No. 2006297590 A, published Nov. 2, 2006, 1 pg.
English Abstract and Machine Translation for Japanese Publication No. 2003-200371 A, published Jul. 15, 2003, 11 pgs.
Untranslated Decision to Grant issued by Japan Patent Office (JPO) dated Dec. 25, 2018 in corresponding JP Application No. 2017-026567, 3 pgs.
English Machine Translation of Decision to Grant issued by Japan Patent Office (JPO) dated Dec. 25, 2018 in corresponding, JP Application No. 2017-026567, 3 pgs.
Untranslated Notification of Reasons for Refusal issued by Japan Patent Office (JPO) dated Sep. 18, 2018 in corresponding JP Application No. 2017-026567, 6 pgs.
English Machine Translation of Notification of Reasons for Refusal issued by Japan Patent Office (JPO) dated Sep. 18, 2018 in corresponding JP Application No. 2017-026567, 5 pgs.
English Abstract and Machine Translation for Japanese Publication No. 2016-016496 A, published Feb. 1, 2016, 34 pages.
English Abstract and Machine Translation for Japanese Publication No. 2016-060018 A, published Apr. 25, 2016, 14 pages.
English Abstract and Machine Translation for Japanese Publication No. 2015-177304 A, published Oct. 5, 2015, 17 pages.
English Abstract and Machine Translation for Japanese Publication No. 2006-277531 A, published Oct. 12, 2006, 54 pages.
English Abstract and Machine Translation for Japanese Publication No. 2007-042061 A, published Feb. 15, 2007, 12 pages.
English Abstract and Translation for Japanese Publication No. 2006-297589 A, published Nov. 2, 2006, 40 pages.
English Abstract and Machine Translation for Japanese Publication No. 2016-060016 A, published Apr. 25, 2016, 28 pages.
English Abstract and Machine Translation for Japanese Publication No. 2018-517571 A, published Jul. 5, 2018, 17 pages.

\* cited by examiner

ROBOT OPERATION COMMAND SYSTEM, TABLET TERMINAL AND CONTROL METHOD OF TABLET TERMINAL

CROSS-REFERENCE TO RELATED APPLICATION

This application is based upon and claims the benefit of priority from Japanese Patent Application No. 2017-026567 filed on Feb. 16, 2017, the contents of which are incorporated herein by reference.

BACKGROUND OF THE INVENTION

Field of the Invention

The present invention relates to an operation command system and a tablet terminal for transmitting operation command signals to a controller for controlling a robot, and also relates to a control method of the tablet terminal.

Description of the Related Art

Japanese Laid-Open Patent Publication No. 2016-068242 discloses a device in which, when an enable switch is pressed after a portable device has been placed on a docking base that is connected to a control unit by wire, virtual keys are displayed on a touch screen and then the portable device wirelessly transmits signals to the control unit, to thereby operate the robot.

SUMMARY OF THE INVENTION

The device disclosed in the above Japanese Laid-Open Patent Publication No. 2016-068242 has a problem that if the control unit to which the portable device is wirelessly connected and the control unit to which the docking base is connected by wire are different from each other, a robot other than a robot that the operator intends to control is accidentally operated.

The present invention has been devised to solve the above problem. It is therefore an object of the present invention to provide a robot operation command system, a tablet terminal and a tablet terminal control method, which can prevent a robot other than a robot that an operator intends to control, from being operated.

An aspect of the present invention resides in an operation command system for robots, a tablet terminal and a control method of the tablet terminal, in which the robot is prevented from being operated by an operation signal when the identification information of a controller to which a base holding the tablet terminal is connected does not coincide with the identification information of the controller to which the tablet terminal is connected.

According to the present invention, it is possible to prevent the operation of another robot different from the robot that the operator intends to operate.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, a robot operation command system, a tablet terminal and a control method of the tablet terminal according to the present invention will be detailed by describing a preferred embodiment with reference to the accompanying drawings.

[Configuration of Operation Command System]

Figure 1:
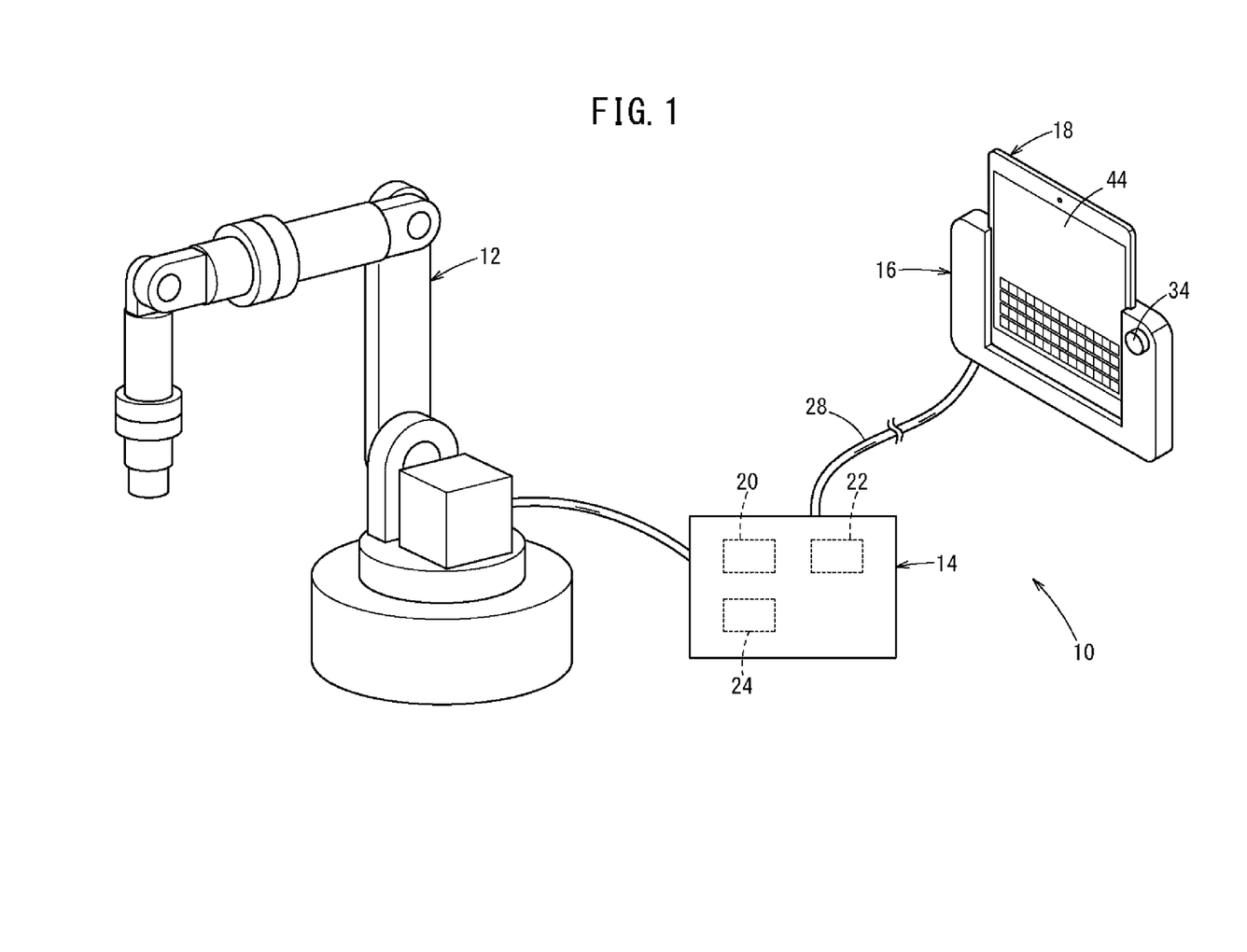
FIG. 1 is a schematic diagram showing a partial configuration of an operation command system.
Figure 2:
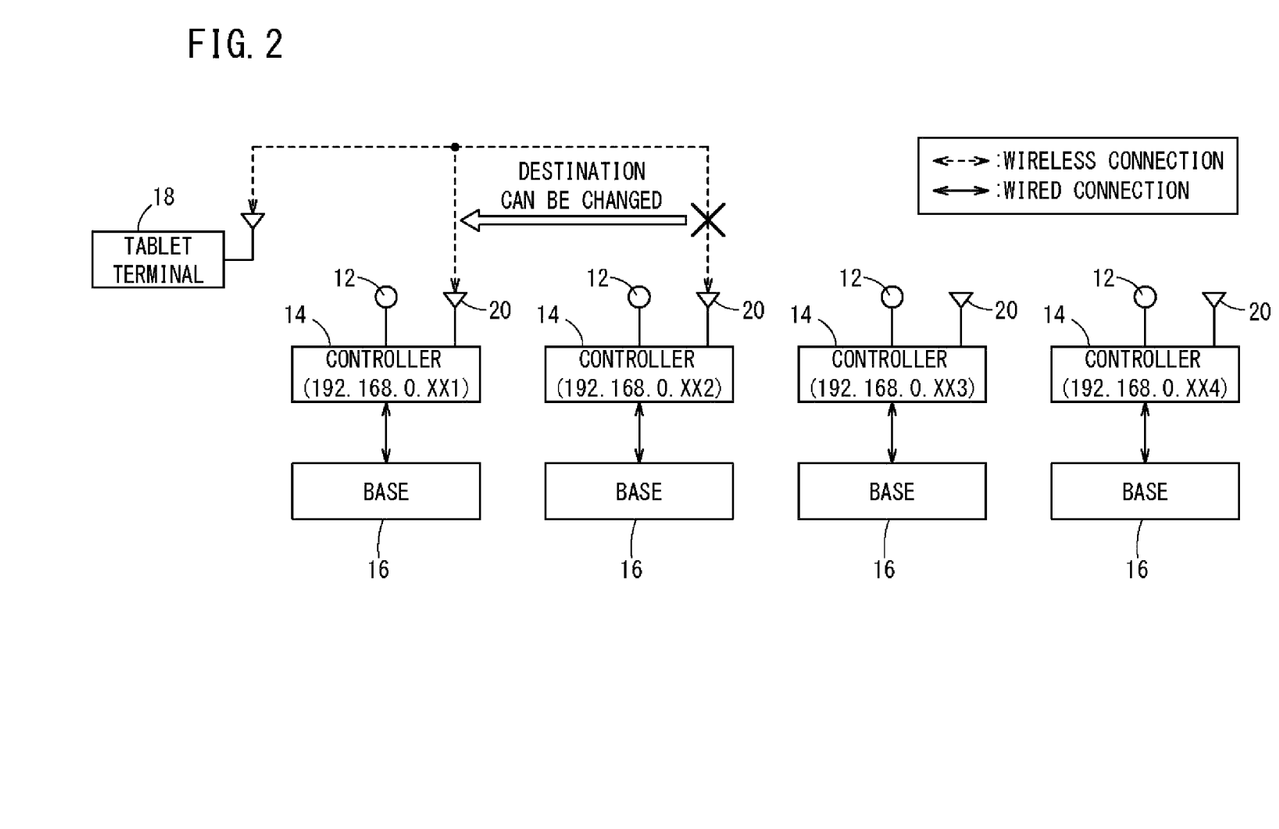
FIG. 2 is a schematic diagram showing connection between a tablet terminal and a controller.
Figure 3:
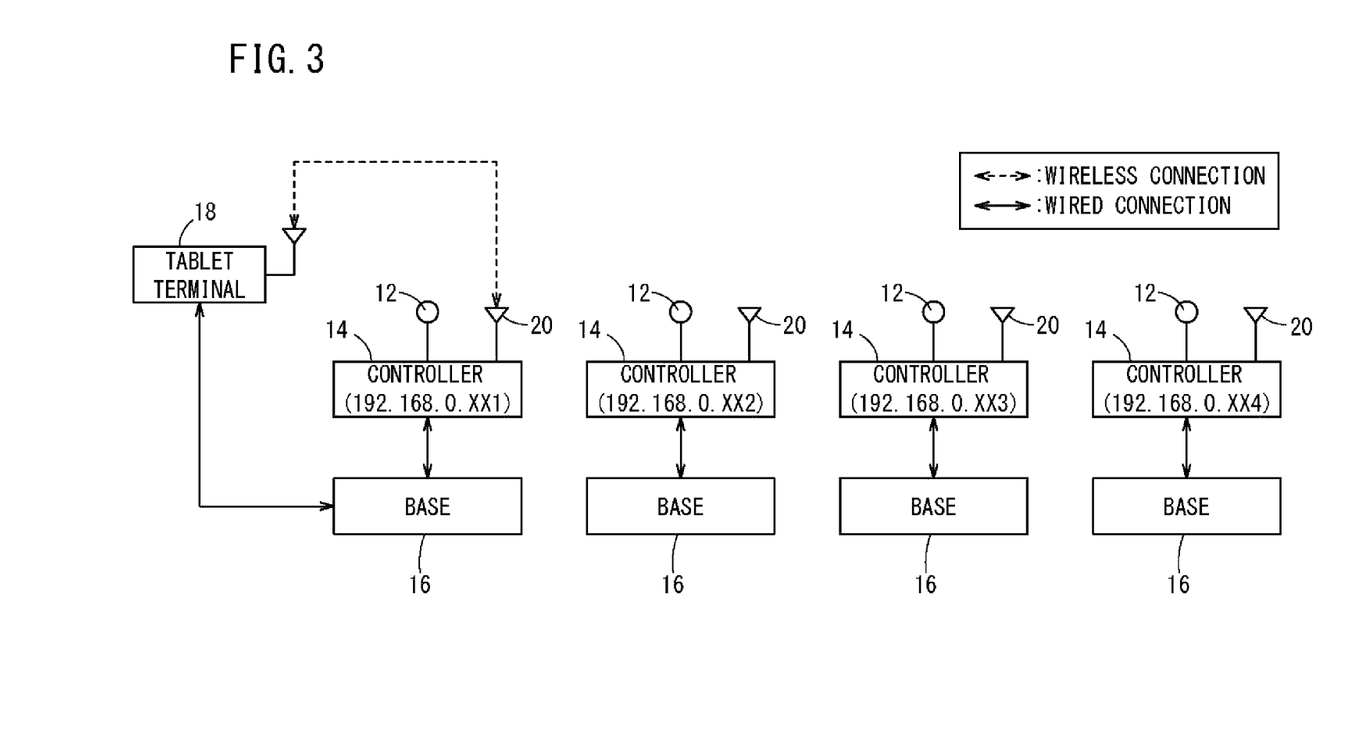
FIG. 3 is a schematic diagram showing connection between a tablet terminal and a controller.

FIG. 1 is a schematic diagram showing a configuration of an operation command system 10 according to the present embodiment. FIGS. 2 and 3 are schematic diagrams showing connection between a tablet terminal 18 and a controller 14. The operation command system 10 includes multiple controllers 14, bases 16 connected to the respective controllers 14 by wire, and a tablet terminal 18 that performs wireless connection to one of the controllers 14.

One controller 14 is provided for each robot 12 to control the robot 12. The controller 14 and the tablet terminal 18 communicate with each other wirelessly on a one-ton-one basis, rather than communicating via the above-mentioned network. As shown in FIG. 2, the tablet terminal 18 is connected to one controller 14. Further, by releasing the current connection with the one controller 14, it can establish a new connection to another controller 14. Further, as shown in FIG. 3, the tablet terminal 18 is held on a base 16 and connected to the base 16 by wire. Even when the tablet terminal 18 is held on the base 16, the tablet terminal 18 and the controller 14 perform wireless communication without passing through the base 16 or a cable 28.

The tablet terminal 18 is a general-purpose one, which by downloading a dedicated application, makes it possible for an operator to create a program for controlling the robot 12 and also to control the robot 12 through operation of the tablet terminal 18.

The tablet terminal 18 wirelessly transmits to the controller 14 the created program and operation signals for operating the robot 12 in response to operation of the tablet terminal 18 by the operator. It should be noted that the tablet terminal 18 is configured to be able to transmit operation signals to the controller 14 only when the tablet terminal 18 is held on the base 16. When the tablet terminal 18 is separated from the base 16, the created program can be transmitted from the tablet terminal 18 to the controller 14, but transmission of the operation signals is prohibited.

The controller 14 includes a transmission and reception antenna 20, a storage unit 22 and a processing unit 24. The transmission and reception antenna 20 is an antenna for wirelessly communicating with tablet terminals 18, receives programs, operation signals and the like transmitted from the tablet terminals 18, and transmits identification information and the like stored in the storage unit 22 to the tablet terminal 18. The storage unit 22 is a rewritable storage medium such as a magnetic storage device, flash memory and the like, and stores a program created in the tablet terminal 18 and received by the transmission and reception antenna 20, unique identification information assigned to the controller 14, etc. The identification information is, for example, an IP address, and an address such as "192.168.0.XX1" is assigned to the controller 14. The identification information is not limited to an IP address, but may be a MAC address or the like.

The processing unit 24 computes command signals for operating the robot 12 according to the operation signal received by the transmission and reception antenna 20 and the program stored in the storage unit 22. The controller 14 is wire-connected to the base 16 by the cable 28, and the controller 14 transmits the identification information stored in the storage unit 22 to the base 16 via the cable 28.

Figure 4:
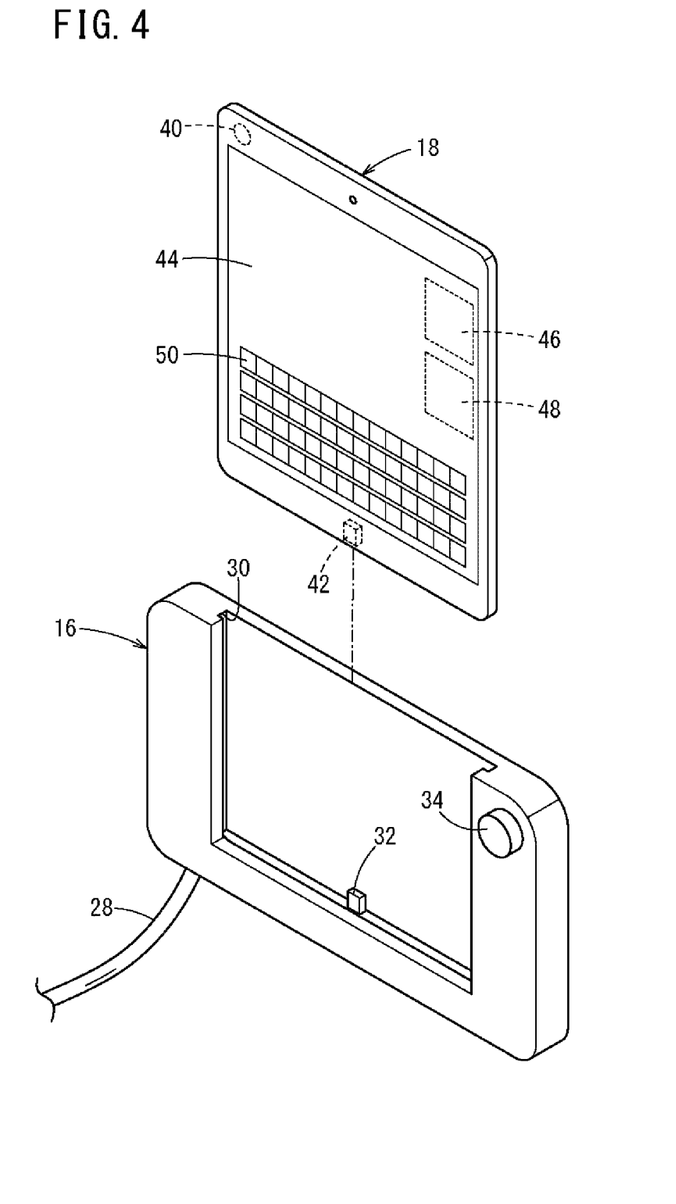
FIG. 4 is a view showing a state in which a tablet terminal is detached from a base.
Figure 5:
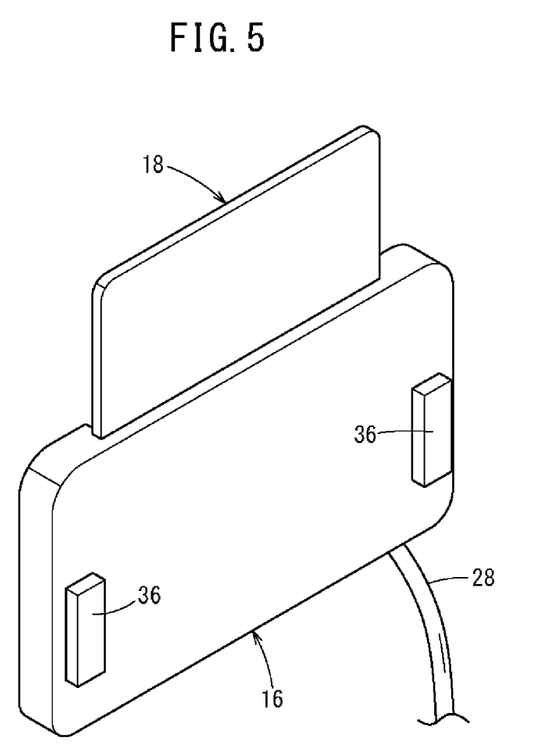
FIG. 5 is a view of a base from the rear side.

FIG. 4 is a view showing a state in which the tablet terminal 18 is detached from the base 16. FIG. 5 is a view of the base 16 from the rear side. The base 16 includes a slot (holder) 30, a communication connector plug (connector) 32, an emergency stop button 34 and a deadman switch 36. The tablet terminal 18 is inserted into the slot 30. With the tablet terminal 18 inserted in the slot 30, the base 16 can hold the tablet terminal 18.

The communication connector plug 32 is a terminal for enabling connection between the tablet terminal 18 and the base 16. When the tablet terminal 18 is inserted in the slot 30, the communication connector plug 32 is inserted into and connected to an aftermentioned communication connector receptacle 42 of the tablet terminal 18 so as to establish wire connection between the tablet terminal 18 and the base 16. The emergency stop button 34 is a button for emergently stopping the robot 12 when an operator operates the emergency stop button 34, and is arranged at a position on the front side of the base 16 where the operator is easy to operate. The deadman switch 36 is disposed on the rear side of the base 16, and the operator can turn on the deadman switch 36 by pressing the deadman switch 36 with a finger while gripping the base 16. The operator can operate the tablet terminal 18 to control the robot 12 only when he/she is pressing the deadman switch 36 into an on state. The operation state of the deadman switch 36, i.e., the on/off state thereof is transmitted to the tablet terminal 18 via the communication connector plug 32.

The tablet terminal 18 includes a transmission and reception antenna 40, a communication connector receptacle 42, a touch panel display 44, a storage unit 46 and a processing unit 48. The transmission and reception antenna 40 is an antenna for wirelessly communicating with the controller 14, and transmits programs, operation signals and the like to the controller 14, and receives identification information etc. transmitted from the controller 14.

The communication connector plug 32 of the base 16 is inserted into the communication connector receptacle 42 when the tablet terminal 18 is held on the base 16. When the tablet terminal 18 is held on the base 16, the identification information of the controller 14 connected to the base 16 and the operation state of the deadman switch 36 are sent from the base 16 to the tablet terminal 18 via the communication connector plug 32. The touch panel display 44 is a display unit for displaying text (characters), images, etc., and also functions as an input unit operated by the operator. The touch panel display 44 displays operation keys 50, which allow the operator to create programs and control the robot 12 by touching the operation keys 50. The storage unit 46 is a rewritable storage medium such as a flash memory, and stores the created programs and others.

Figure 6:
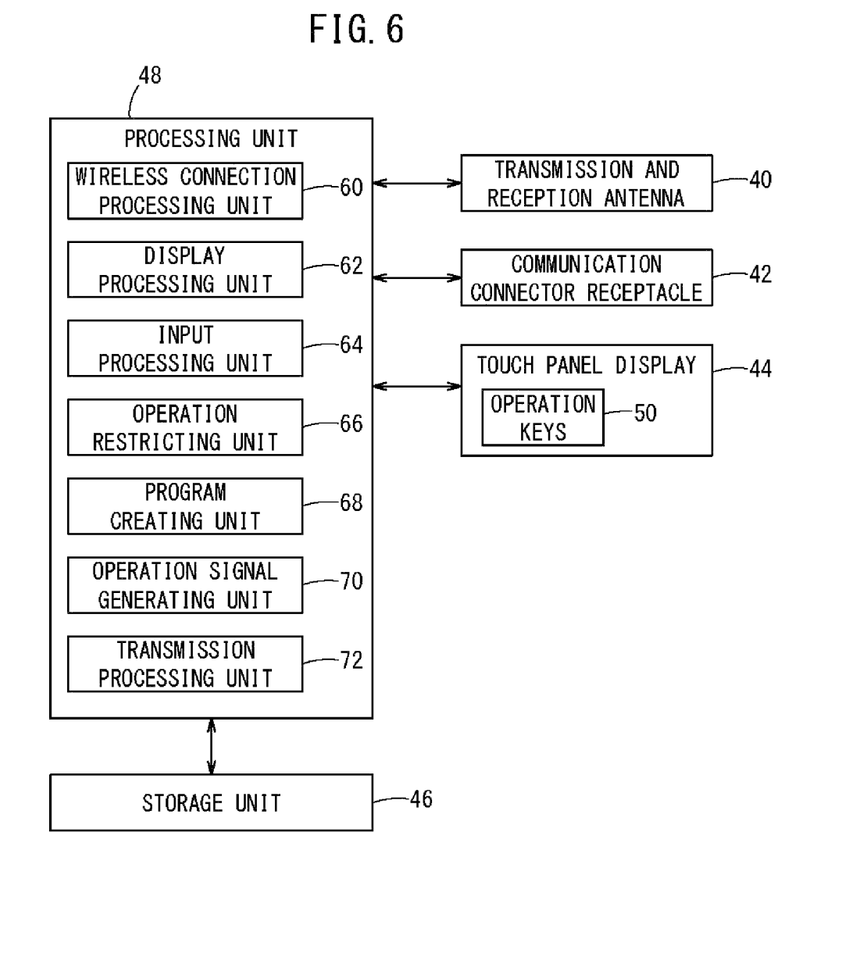
FIG. 6 is a block diagram showing a configuration of a processing unit.

FIG. 6 is a block diagram showing the configuration of the processing unit 48. The processing unit 48 includes a wireless connection processing unit 60, a display processing unit 62, an input processing unit 64, an operation restricting unit 66, a program creating unit 68, an operation signal generating unit 70 and a transmission processing unit 72.

The wireless connection processing unit 60 establishes connection between the tablet terminal 18 and the controller 14, and releases the connection. The display processing unit 62 performs image processing for displaying images (including operation keys 50), text (characters) and the like on the touch panel display 44. The input processing unit 64 processes input signals in accordance with operation of the operation keys 50 by the operator. When the tablet terminal 18 is held on the base 16, if the controller 14 to which the tablet terminal 18 is connected does not coincide with the controller 14 connected to the base 16, the operation restricting unit 66 performs operation restricting process so as to prohibit the operator from operating the robot 12 through the tablet terminal 18. This operation restricting process will be described in detail later.

The program creating unit 68 creates a program as the operator operates the operation keys 50. The program created by the program creating unit 68 is stored in the storage unit 46. The operation signal generating unit 70 generates operation signals in accordance with the operation keys 50 operated by the operator. The transmission processing unit 72 performs a process for transmitting programs and operation signals through the transmission and reception antenna 40.

[Operation Restricting Process]

Figure 7:
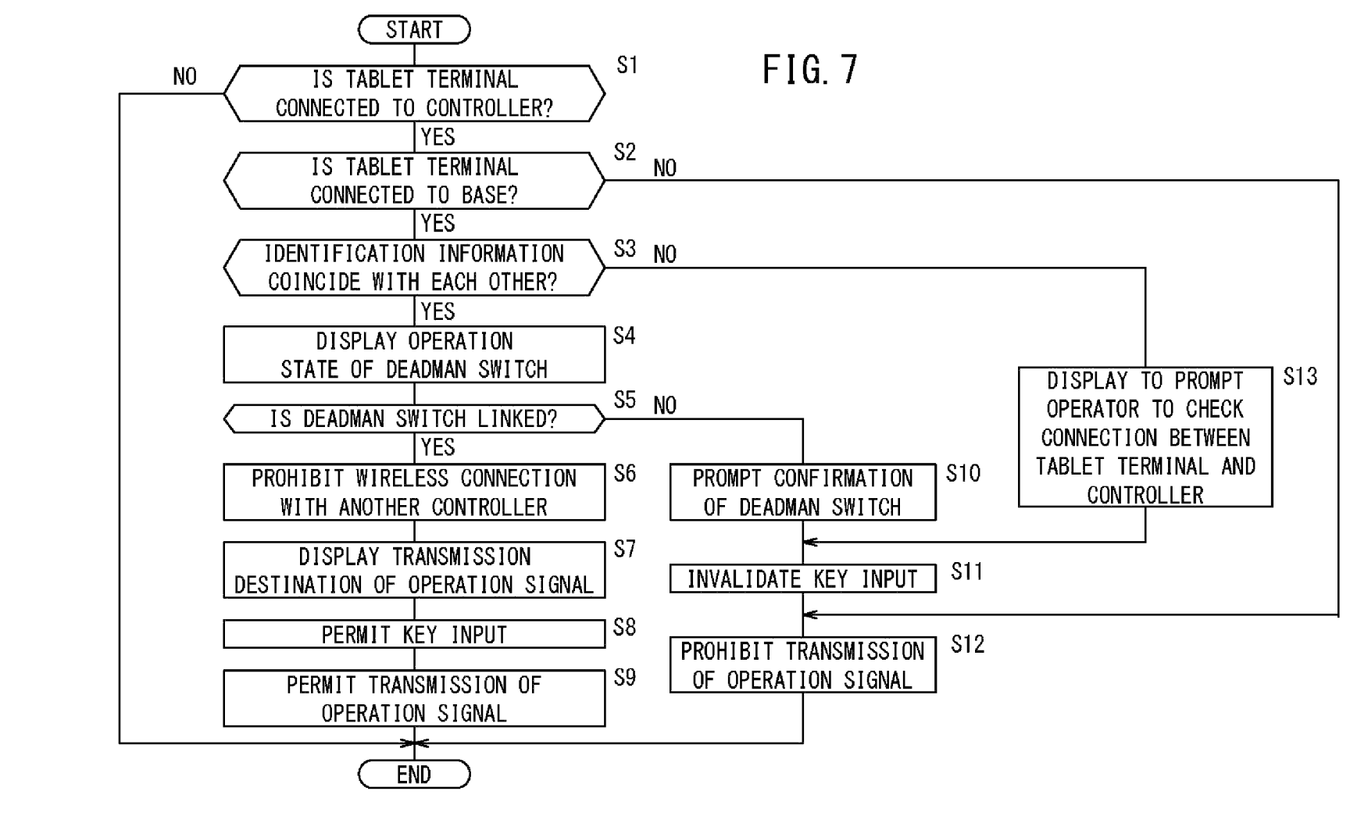
FIG. 7 is a flowchart showing a flow of an operation restricting process performed in a processing unit.

FIG. 7 is a flowchart showing a flow of the operation restricting process performed in the processing unit 48. At step S1, the operation restricting unit 66 determines whether the tablet terminal 18 is wirelessly connected to the controller 14. When the tablet terminal 18 is wirelessly connected to the controller 14, the process proceeds to step S2. When the tablet terminal 18 is not wirelessly connected to the controller 14, the process is terminated.

At step S2, the operation restricting unit 66 determines whether or not the tablet terminal 18 is held in and wire-connected to the base 16. When the tablet terminal 18 is held in the base 16, the process proceeds to step S3. When the tablet terminal 18 is not held in the base 16, the process proceeds to step S12.

At step S3, the operation restricting unit 66 reads the identification information of the controller 14 to which the tablet terminal 18 is wirelessly connected and the identification information of the controller 14 wire-connected to the base 16, and determines whether or not they are identical with each other. When the two pieces of identification information are the same, the process proceeds to step S4. When they do not coincide with each other, the process proceeds to step S13.

At step S4, the display processing unit 62 commands the touch panel display 44 to display an indication that prompts the operator to repeat on and off operations of the deadman switch 36. Further, the display processing unit 62 commands the touch panel display 44 to display the operation state of the deadman switch 36 transmitted from the base 16 to the tablet terminal 18. When the operator checks the operation state of the deadman switch 36 displayed on the touch panel display 44 and confirms the linkage of the displayed operation state with the operation of the deadman switch 36 performed by the operator's own self, the operator touches an unillustrated OK button or the like displayed on the touch panel display 44. When the displayed operation state is not linked with the operation of the deadman switch 36 performed by the operator's own self, the operator touches an unillustrated NG button or the like displayed on the touch panel display 44.

At step S5, the operation restricting unit 66 determines whether or not the displayed operation state is linked with the operation of the deadman switch 36 performed by the operator. When the operator has touched the aforementioned OK button or the like and the displayed operation state is linked with the operation of the deadman switch 36 performed by the operator, the process goes to step S6. When the operator has touched the NG button or the like and the displayed operation state is not linked with the operation of the deadman switch 36, the process goes to step S10.

At step S6, the operation restricting unit 66 commands the wireless connection processing unit 60 to prohibit the tablet terminal 18 from connecting to any controller 14 other than the controller 14 currently connected with the tablet terminal 18. At step S7, the display processing unit 62 causes the touch panel display 44 to display the identification information of the controller 14 to which the operation signal is going to be transmitted. At step S8, the operation restricting unit 66 commands the input processing unit 64 to permit acceptance of input through the operation keys 50. At step S9, the operation restricting unit 66 commands the transmission processing unit 72 to permit transmission of the operation signal to the connected controller 14.

At step S10, the display processing unit 62 causes the touch panel display 44 to display an indication that prompts the operator to check the connection between the base 16 and the controller 14. At step S11, the operation restricting unit 66 commands the input processing unit 64 to prohibit acceptance of the input through the operation keys 50 and invalidate the input. At step S12, the operation restricting unit 66 commands the transmission processing unit 72 to prohibit transmission of operation signals to the connected controller 14. At step S13, the display processing unit 62 causes the touch panel display 44 to display a message or the like prompting the operator to check the connection between the tablet terminal 18 and the controller 14. For example, the touch panel display 44 may display a message etc. that prompts the operator to disconnect the tablet terminal 18 from the currently connected controller 14 and connect the tablet terminal 18 to the controller 14 that is connected to the base 16 holding the tablet terminal 18. Alternatively, the touch panel display 44 may display a message etc. that prompts the operator to dismount the tablet terminal 18 from the base 16 currently holding the tablet terminal 18 and mount the tablet terminal 18 to another base 16 connected to the controller 14 to which the tablet terminal 18 is connected.

[Operation and Effect]

Figure 8:
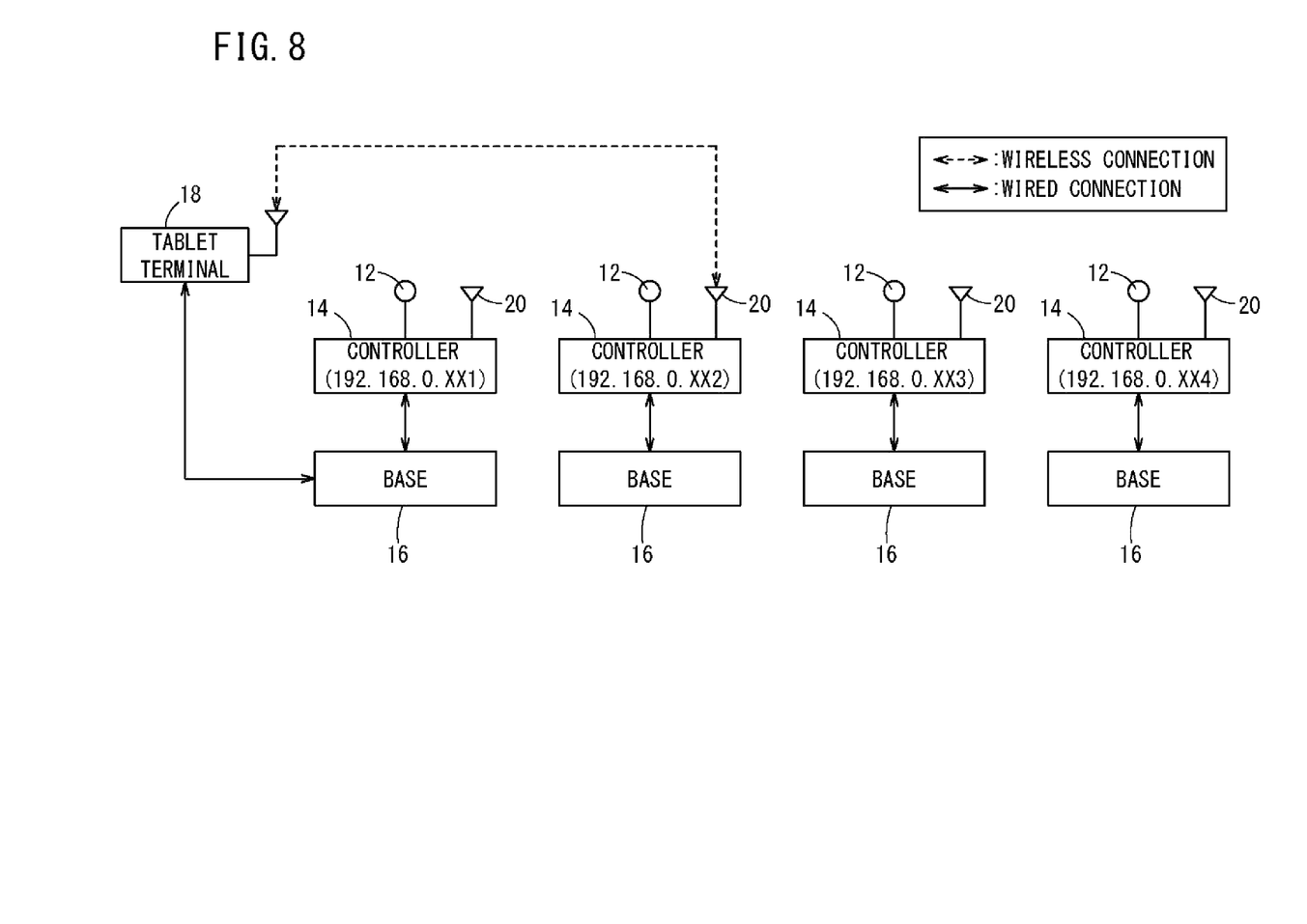
FIG. 8 is a schematic diagram showing connection between a tablet terminal and a controller.

For example, if the above-described operation restricting process is not performed, the following situation would occur. FIG. 8 is a schematic diagram showing connection between the tablet terminal 18 and a controller 14. In the example shown in FIG. 8, the IP address "192.168.0.XX2" of the controller 14 to which the tablet terminal 18 is being connected does not coincide with the IP address "192.168.0.XX1" of the controller 14 that is being connected to the base 16 holding the tablet terminal 18.

At this time, the operator intends to operate the robot 12 connected to the controller 14 having the IP address "192.168.0.XX1", but the tablet terminal 18 is being connected to the controller 14 having the IP address "192.168.0.XX2", so that the operation signals are transmitted from the tablet terminal 18 to the controller 14 of the IP address "192.168.0.XX2". That is, another robot 12 different from the robot 12 which the operator intends to control is operated.

To avoid the above situation, in the present embodiment, when the identification information of the controller 14 to which the base 16 holding the tablet terminal 18 is connected does not coincide with the identification information of the controller 14 to which the tablet terminal 18 is connected, the operation restricting unit 66 of the processing unit 48 of the tablet terminal 18 disables transmission of operation signals to the controller 14 that is being connected. Thus, it is possible to suppress operation of any robots 12 other than the robot 12 that the operator intends to operate using the tablet terminal 18.

Further, in the present embodiment, when the identification information of the controller 14 to which the base 16 holding the tablet terminal 18 is connected does not coincide with the identification information of the controller 14 to which the tablet terminal 18 is connected, the operation restricting unit 66 invalidates the input by the operator through the operation keys 50. As a result, even if the operator inputs commands to operate the robot 12 through the operation keys 50, it is possible to prevent the robot 12 from being operated.

Furthermore, in the present embodiment, when the identification information of the controller 14 to which the base 16 holding the tablet terminal 18 is connected does not coincide with the identification information of the controller 14 to which the tablet terminal 18 is connected, the operation restricting unit 66 commands the display processing unit 62 to display an indication that prompts the operator to check the connection between the tablet terminal 18 and the controller 14 on the touch panel display 44. More specifically, a message or the like may be displayed which prompts the operator to release the current connection between the tablet terminal 18 and the controller 14 and connect the tablet terminal 18 to the controller 14 that is connected to the base 16 holding the tablet terminal 18. Alternatively, another message or the like may be displayed which prompts the operator to dismount the tablet terminal 18 from the base 16 holding the tablet terminal 18 and mount the tablet terminal 18 to another base 16 connected to the controller 14 to which the tablet terminal 18 is connected. Thereby, the operator can recognize wrong connection of the tablet terminal 18 to the controller 14 or the base 16, and can correctly connect the tablet terminal 18 with the controller 14 and the base 16.

Moreover, in the present embodiment, when the identification information of the controller 14 to which the base 16 holding the tablet terminal 18 is connected coincides with the identification information of the controller 14 to which the tablet terminal 18 is connected, the operation restricting unit 66 prohibits the tablet terminal 18 from connecting to any controllers 14 other than the controller 14 currently connected to the tablet terminal 18. Thereby, when the tablet terminal 18 is properly connected with the controller 14 and the base 16, it is possible to prevent the operator from erroneously connecting the tablet terminal 18 with another controller 14.

Further, in the present embodiment, the operation state of the deadman switch 36 transmitted from the base 16 to the tablet terminal 18 is displayed on the touch panel display 44. As a result, the operator can confirm whether or not the operation of the deadman switch 36 performed by the operator's own self corresponds to the information of the deadman switch 36 displayed on the touch panel display 44.

Further, in the present embodiment, before the operation signal is transmitted from the tablet terminal 18, the identification information of the controller 14 to which the operation signal is transmitted is displayed on the touch panel display 44. This configuration enables the operator to recognize the robot 12 that is going to be operated from now.

Other Embodiments

Although the present invention has been described with reference to the embodiment, the technical scope of the present invention is not limited to that described in the above embodiment. It goes without saying that various modifications or improvements can be added to the above embodiment. It is obvious from the description of the scope of the claims that any aspect obtained by adding such modifications or improvements can be included in the technical scope of the present invention.

For example, in the above embodiment, when the controller 14 to which the tablet terminal 18 is connected does not coincide with the controller 14 to which the base 16 holding the tablet terminal 18 is connected, the tablet terminal 18 is prohibited from transmitting the operation signal to the controller 14. Instead of prohibiting the tablet terminal 18 from transmitting the operation signal, it is possible to make the tablet terminal 18 transmit a signal for prohibiting the operation of the robot 12 to the controller 14, and prohibit the controller 14 receiving the signal from controlling the robot 12 to operate.

[Technical Ideas Obtained from the Embodiment]

Technical ideas that can be grasped from the above embodiment will be described below.

An operation command system (10) for robots (12), includes: a plurality of controllers (14) each having identification information and controlling a robot (12); a base (16) establishing a wireless connection or a wired connection with one of the multiple controllers (14); and a tablet terminal (18) configured to perform wireless connection to one of the multiple controllers (14). The base (16) includes: a holder (30) configured to removably hold the tablet terminal (18); and a connector (32) configured to be wire-connected to the tablet terminal (18). The tablet terminal (18) includes: an operation signal generating unit (70) configured to generate an operation signal for causing the controller (14) to operate the robot (12); and an operation restricting unit (66) configured to prevent the robot (12) from being operated by the operation signal when the identification information of the controller (14) to which the base (16) holding the tablet terminal (18) is connected does not coincide with the identification information of the controller (14) to which the tablet terminal (18) is connected. With this configuration, it is possible to prevent an erroneous operation of a robot (12) that is different from the robot (12) the operator intends to operate using the tablet terminal (18).

The operation restricting unit (66) may be configured to disable transmission of the operation signal to the controller (14) to which the tablet terminal (18) is connected when the identification information of the controller (14) to which the base (16) holding the tablet terminal (18) is connected does not coincide with the identification information of the controller (14) to which the tablet terminal (18) is connected. This makes it possible to prevent an erroneous operation of a robot (12) that is different from the robot (12) the operator intends to operate using the tablet terminal (18).

The tablet terminal (18) may include an input unit (50) configured to allow an operator to input a command for operating the robot (12). The operation restricting unit (66) may be configured to invalidate inputting to the input unit (50) by the operator when the identification information of the controller (14) to which the base (16) holding the tablet terminal (18) is connected does not coincide with the identification information of the controller (14) to which the tablet terminal (18) is connected. As a result, even when the operator inputs a command to operate the robot (12) through the input unit (50), it is possible to prevent the robot (12) from being operated.

The tablet terminal (18) may include a notifying unit (44) configured to, when the identification information of the controller (14) to which the base (16) holding the tablet terminal (18) is connected does not coincide with the identification information of the controller (14) to which the tablet terminal (18) is connected, notify the operator of the fact that the identification information does not coincide with each other. Thereby, the operator can recognize wrong connection of the tablet terminal (18) to the controller (14) or the base (16) and can correctly connect the tablet terminal (18) with the controller (14) and base (16).

The notifying unit (44) may be configured to give to the operator a notification for prompting the operator to release connection between the tablet terminal (18) and the controller (14) and connect the tablet terminal (18) with the controller (14) to which the base (16) is connected, when the identification information of the controller (14) to which the base (16) holding the tablet terminal (18) is connected does not coincide with the identification information of the controller (14) to which the tablet terminal (18) is connected. Thereby, the operator can recognize wrong connection of the tablet terminal (18) to the controller (14) or the base (16) and can correctly connect the tablet terminal (18) to the controller (14) and base (16).

The notifying unit (44) may be configured to give to the operator a notification for prompting the operator to dismount the tablet terminal (18) from the base (16) and mount the tablet terminal (18) to the base (16) connected to the controller (14) to which the tablet terminal (18) is connected, when the identification information of the controller (14) to which the base (16) holding the tablet terminal (18) is connected does not coincide with the identification information of the controller (14) to which the tablet terminal (18) is connected. Thereby, the operator can recognize wrong connection of the tablet terminal (18) to the controller (14) or the base (16) and can correctly connect the tablet terminal (18) to the controller (14) and base (16).

The operation command system (10) may further include a wireless connection processing unit (60) configured to wirelessly connect the tablet terminal (18) to one of the controllers (14). The wireless connection processing unit (60) may be configured to prohibit the tablet terminal 18 from connecting to any controller (14) other than the controller (14) currently connected with the tablet terminal 18 when the identification information of the controller (14) to which the base (16) holding the tablet terminal (18) is connected coincides with the identification information of the controller (14) to which the tablet terminal (18) is connected. Thereby, when the tablet terminal (18) is properly connected with the controller (14) and the base (16), it is possible to prevent the operator from erroneously connecting the tablet terminal (18) to another controller (14).

The base (16) may be configured to transmit the operation state of a deadman switch (36) to the tablet terminal (18), and the tablet terminal (18) may include a notifying unit (44) configured to notify an operator of the operation state of the deadman switch (36) received from the base (16) holding the tablet terminal (18). This configuration enables the operator to confirm whether or not the operation of the deadman switch (36) performed by the operator's own self corresponds to the notified information of the deadman switch (36).

The tablet terminal (18) may include a notifying unit (44) configured to notify an operator of the identification information of the controller (14) to which the operation signal is transmitted when the identification information of the controller (14) to which the base (16) holding the tablet terminal (18) is connected coincides with the identification information of the controller (14) to which the tablet terminal (18) is connected. This configuration enables the operator to recognize the robot (12) that is going to be operated from now.

A tablet terminal (18) establishes a wireless connection with one of a plurality of controllers (14) each having identification information and transmits an operation signal for commanding the operation of a robot (12) to the wirelessly connected controller (14). The tablet terminal (18) is removably held in a base (16) that is wiredly or wirelessly connected to one of the multiple controllers (14). The tablet terminal (18) includes an operation restricting unit (66) configured to prevent the robot (12) from being operated by the operation signal when the identification information of the controller (14) to which the base (16) holding the tablet terminal (18) is connected does not coincide with the identification information of the controller (14) to which the tablet terminal (18) is connected. With this configuration, it is possible to prevent an erroneous operation of a robot (12) that is different from the robot (12) the operator intends to operate using the tablet terminal (18).

In a control method of a tablet terminal (18) that establishes a wireless connection with one of a plurality of controllers (14) each having identification information and transmits an operation signal for commanding the operation of a robot (12) to the wirelessly connected controller (14), the tablet terminal (18) is configured to be removably held in a base (16) that is wiredly or wirelessly connected to one of the controllers (14). The control method includes a step of preventing the robot (12) from being operated by the operation signal when the identification information of the controller (14) to which the base (16) holding the tablet terminal (18) is connected does not coincide with the identification information of the controller (14) to which the tablet terminal (18) is connected. Thus, it is possible to prevent an erroneous operation of a robot (12) that is different from the robot (12) the operator intends to operate using the tablet terminal (18).

What is claimed is:

1. A control method of a tablet terminal configured to establish a wireless connection with one of multiple controllers each having identification information and transmit an operation signal for commanding operation of a robot to the wirelessly connected controller, wherein the tablet terminal is configured to be removably held in a base configured to be wiredly or wirelessly connected to one of the controllers, the control method comprising a step of preventing the robot from being operated by the operation signal when the identification information of the controller to which the base holding the tablet terminal is connected does not coincide with the identification information of the controller to which the tablet terminal is connected in a state where the tablet terminal is able to transmit the operation signal.

2. A tablet terminal configured to establish a wireless connection with one of multiple controllers each having identification information and transmit an operation signal for commanding operation of a robot to a wirelessly connected controller, the tablet terminal being removably held in a base configured to be wiredly or wirelessly connected to one of the multiple controllers, the tablet terminal comprising:

an operation restricting unit configured to prevent the robot from being operated by the operation signal when the identification information of the controller to which the base holding the tablet terminal is connected does not coincide with the identification information of the controller to which the tablet terminal is connected in a state where the tablet terminal is able to transmit the operation signal.

3. An operation command system for robots, comprising:

multiple controllers each having identification information and configured to control a robot;

a base configured to establish a wireless connection or a wired connection with one of the multiple controllers; and a tablet terminal configured to perform wireless connection to one of the multiple controllers, wherein, the base includes:

a holder configured to removably hold the tablet terminal; and a connector configured to be wire-connected to the tablet terminal, the tablet terminal includes:

an operation signal generating unit configured to generate an operation signal for causing the controller to operate the robot; and an operation restricting unit configured to prevent the robot from being operated by the operation signal when the identification information of the controller to which the base holding the tablet terminal is connected does not coincide with the identification information of the controller to which the tablet terminal is connected in a state where the tablet terminal is able to transmit the operation signal.

4. The operation command system for the robots according to claim 3, wherein the operation restricting unit is configured to disable transmission of the operation signal to the controller to which the tablet terminal is connected, when the identification information of the controller to which the base holding the tablet terminal is connected does not coincide with the identification information of the controller to which the tablet terminal is connected in the state where the tablet terminal is able to transmit the operation signal.

5. The operation command system for the robots according to claim 3, wherein:

the tablet terminal includes an input unit configured to allow an operator to input a command for operating the robot; and the operation restricting unit is configured to invalidate inputting to the input unit by the operator when the identification information of the controller to which the base holding the tablet terminal is connected does not coincide with the identification information of the controller to which the tablet terminal is connected in the state where the tablet terminal is able to transmit the operation signal.

6. The operation command system for the robots according to claim 3, wherein the tablet terminal includes a notifying unit configured to, when the identification information of the controller to which the base holding the tablet terminal is connected does not coincide with the identification information of the controller to which the tablet terminal is connected in the state where the tablet terminal is able to transmit the operation signal, notify an operator of a fact that the identification information does not coincide with each other.

7. The operation command system for the robots according to claim 6, wherein the notifying unit is configured to give to the operator a notification of prompting the operator to release connection between the tablet terminal and the controller and connect the tablet terminal to the controller to which the base is connected, when the identification information of the controller to which the base holding the tablet terminal is connected does not coincide with the identification information of the controller to which the tablet terminal is connected in the state where the tablet terminal is able to transmit the operation signal.

8. The operation command system for the robots according to claim 6, wherein the notifying unit is configured to give to the operator a notification of prompting the operator to dismount the tablet terminal from the base and mount the tablet terminal to the base connected to the controller to which the tablet terminal is connected, when the identification information of the controller to which the base holding the tablet terminal is connected does not coincide with the identification information of the controller to which the tablet terminal is connected in the state where the tablet terminal is able to transmit the operation signal.

9. The operation command system for the robots according to claim 3, further comprising a wireless connection processing unit configured to wirelessly connect the tablet terminal to one of the controllers,
wherein the wireless connection processing unit is configured to prohibit the tablet terminal from connecting to any controller other than the controller currently connected with the tablet terminal, when the identification information of the controller to which the base holding the tablet terminal is connected coincides with the identification information of the controller to which the tablet terminal is connected in the state where the tablet terminal is able to transmit the operation signal.

10. The operation command system for the robots according to claim 3, wherein:
the base is configured to transmit an operation state of a deadman switch to the tablet terminal; and
the tablet terminal includes a notifying unit configured to notify an operator of the operation state of the deadman switch received from the base holding the tablet terminal.

11. The operation command system for the robots according to claim 3, wherein the tablet terminal includes a notifying unit configured to notify an operator of the identification information of the controller to which the operation signal is transmitted when the identification information of the controller to which the base holding the tablet terminal is connected coincides with the identification information of the controller to which the tablet terminal is connected in the state where the tablet terminal is able to transmit the operation signal.

* * * * *